March 22, 1949.　　　H. J. WILLIAMS ET AL　　　2,465,181
MOTOR VEHICLE BOGIE UNIT
Filed Nov. 29, 1946　　　3 Sheets-Sheet 1
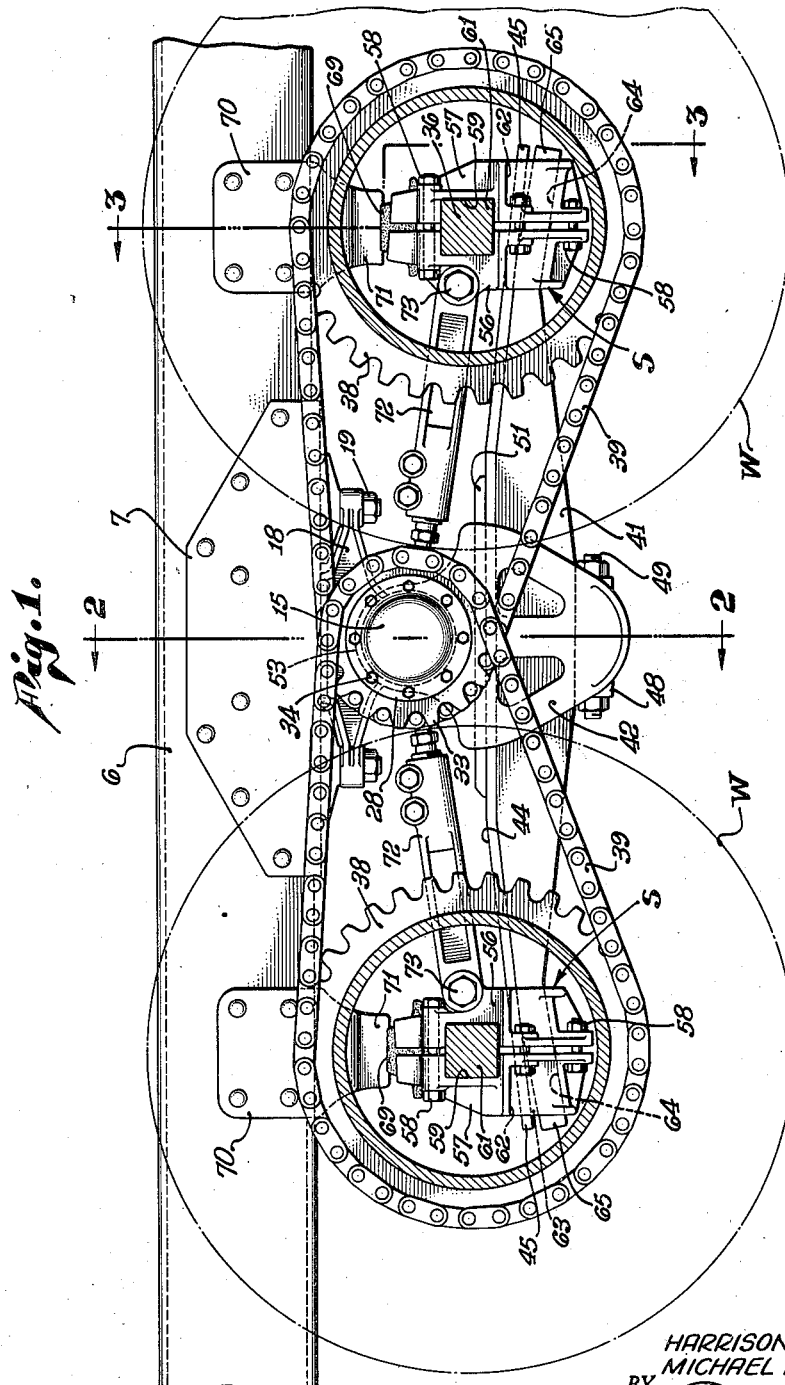
INVENTOR.
HARRISON J. WILLIAMS
MICHAEL AMBARCUMIAN
BY
ATTORNEY

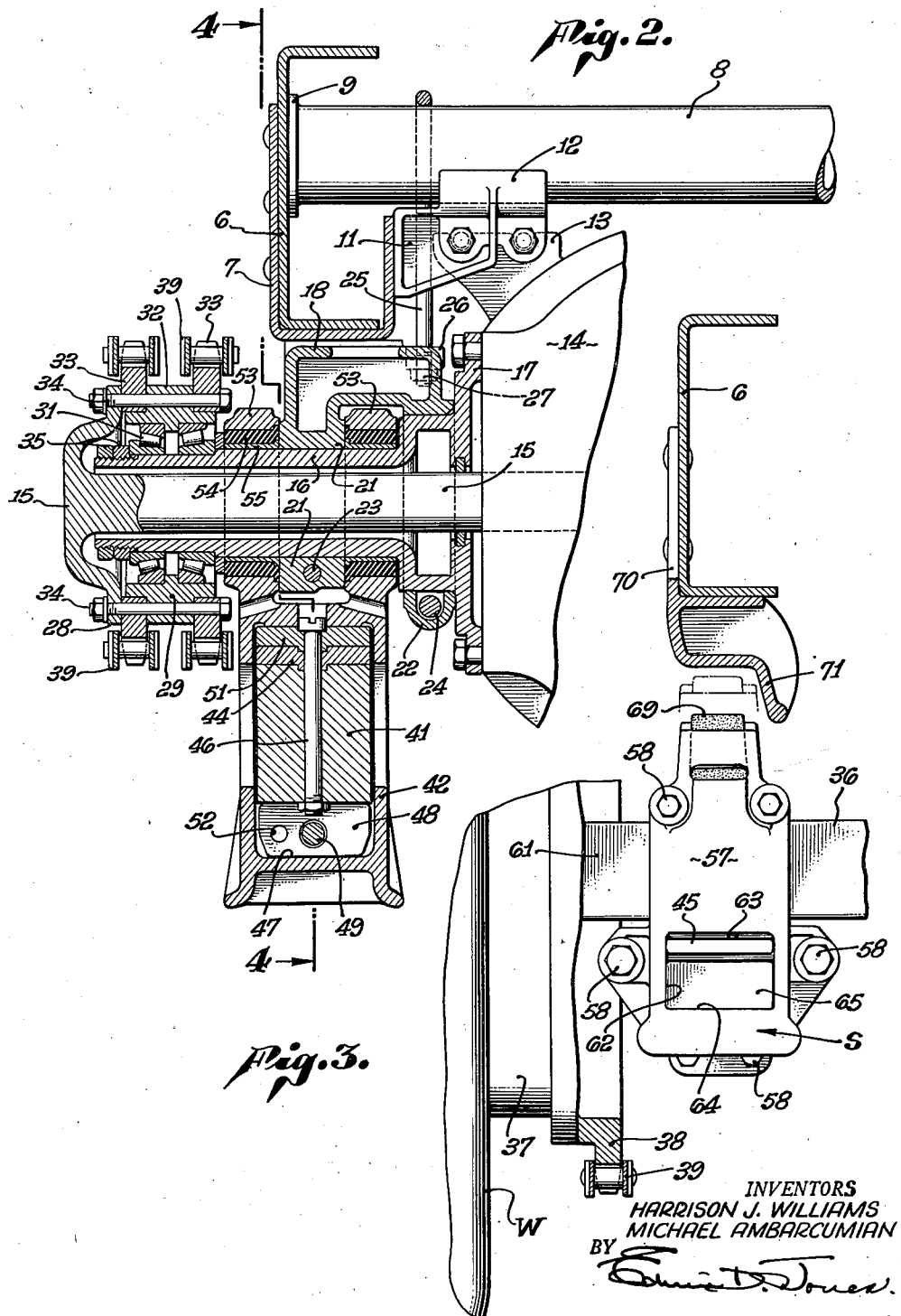

March 22, 1949.  H. J. WILLIAMS ET AL  2,465,181
MOTOR VEHICLE BOGIE UNIT
Filed Nov. 29, 1946  3 Sheets-Sheet 3
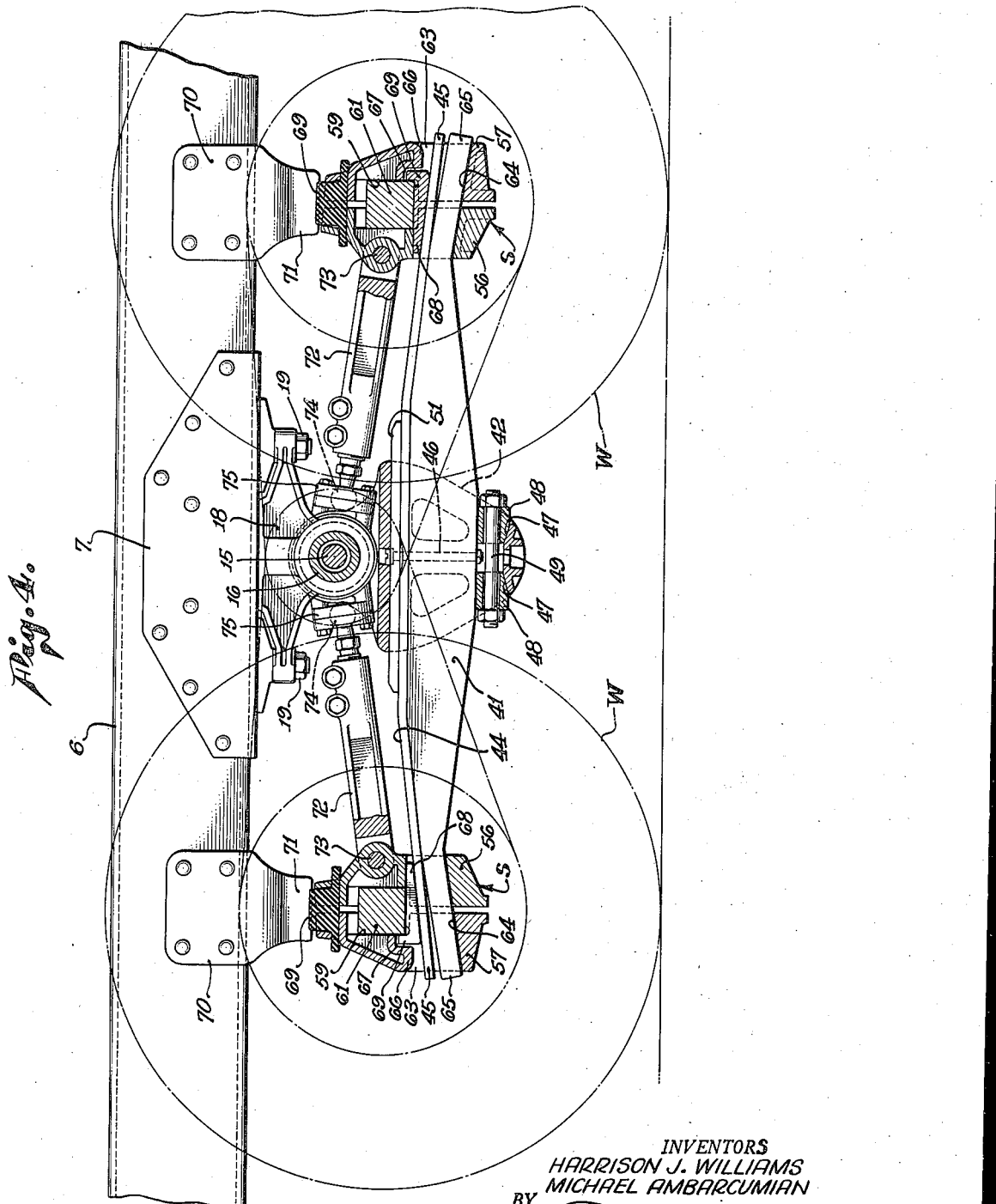
INVENTORS
HARRISON J. WILLIAMS
MICHAEL AMBARCUMIAN
BY
ATTORNEY Patented Mar. 22, 1949

2,465,181

UNITED STATES PATENT OFFICE 2,465,181

MOTOR VEHICLE BOGIE UNIT

Harrison J. Williams, Garvey, and Michael Ambarcumian, Los Angeles, Calif., assignors to Cook Bros., Los Angeles, Calif., a copartnership consisting of Howard F. Cook and Charles E. Cook Application November 29, 1946, Serial No. 712,984

11 Claims. (Cl. 280—104.5)

Our invention relates to motor vehicles of the six wheel type, and has as a purpose the provision of a four wheel bogie unit for such a vehicle wherein the bogie is suspended in a manner to minimize the occurrence of bogie hopping both under conditions of brake torque and from encounter with road surface irregularities, and which is particularly advantageous for chain-driven bogie units.

It is also a purpose of our invention to provide an improved bogie in which the use of springs is almost entirely eliminated, with resultant simplicity, and economy of manufacture.

A further purpose of our invention is to provide a bogie supporting the vehicle directly and positively without interposition of resilient springs, so that the oscillation due to springs is eliminated, and yet minimizing the effect of road shocks and brake torque.

Reference is here made to United States Patent No. 2,400,199, issued to Henry C. Harbers, in which is described a four-wheel chain-driven bogie wherein a multiple leaf spring is mounted in a saddle riding pivotally upon and above the jack-shaft sleeve, and is secured at its ends in stirrups mounted on the wheel axles and arranged to act in concert with radius rods to flex the spring. Our present invention, while having a jack shaft sleeve and chain drive in general similar to the foregoing, differs therefrom in numerous respects, important among which is the elimination of the multiple leaf spring and the substitution therefor of a rocker-arm connecting the axle stirrups and mounted below the jack shaft in a saddle swung downwardly from the jack shaft sleeve.

We will describe only one form of motor vehicle bogie unit embodying our invention and will then point out the novel features thereof in claims.

In the accompanying drawings:

Figure 1 is a view showing in fragmentary side elevation one form of motor vehicle embodying our invention.

Figure 2 is a vertical sectional view on the line 2—2 of Figure 1, and on an enlarged scale.

Figure 3 is a vertical sectional view on the same scale as Figure 2, and on the line 3—3 of Figure 1.

Figure 4 is a vertical sectional view on the line 4—4 of Figure 2, and on the scale of Figure 1.

Referring specifically to the drawings, our invention in its present embodiment comprises a vehicle frame having side members 6, of which only one is illustrated, it being understood that both sides of the vehicle and of the bogie are identical. A U-shaped bracket 7 is secured to frame member 6 and a tube 8 is secured transversely of the vehicle to both the frame members by end-flanges 9. A second bracket 11, which we term a torque bracket, as its function is to prevent torsion of the hereinafter described differential housing and associated parts, is welded to the inner arm of the bracket 7 and has a semi-cylindrical portion 12 braced against the tube 8 so that the tube, the frame member 6, and the brackets 7 and 11 form a closed circuit resistant to horizontal forces either lateral or longitudinal of the vehicle frame. A torque ear 13, secured to a differential housing 14, is bolted to the torque bracket 11, thus holding the differential housing in fixed relation to the frame member 6.

A jack-shaft 15 extends outwardly from the differential housing 14, where it is connected to the differential mechanism within the housing, and passes rotatably through a hollow spindle 16 which has an inner end flange 17 bolted to the housing. The rigid connection of the housing 14 and spindle 16 to the frame member 6 is further solidified by a bracket 18 bolted to the bracket 7 by bolts 19 and having split cylindrical portions 21 and 22 clamped around the sleeve 16 by clamping bolts 23 and 24. The bracket 18 is also suspended from the tube 8 by a hanger rod 25 bent around the tube and having the extremities of its arms secured in ears 26 of the bracket 18 by nuts 27.

The outer end of the jack-shaft 15 projects from the spindle 16 and is formed with a flange 28. A hub 29 which is journalled on the spindle 16 by bearings 31 is formed with an annular central rib 32, on opposite sides of which are mounted a pair of driving sprockets 33; and the flange 28, hub 29, and sprockets 33 are held together, to rotate in unison, by bolts 34. Bearings 31 are held on the spindle 16 by lock-nuts 35.

The bogie unit has two axles 36 positioned respectively forward and rearward from the spindle 16 and fitted with drive wheels W, forming a four wheel driving unit. The wheels W are provided with suitable brakes 37, operated in any desired manner, and carry sprockets 38 driven from the sprockets 33 by chains 39.

Connecting the axles 36 to the jack-shaft assembly and thence to the frame member 6, to support the latter, is a rocker arm 41 held at its medial point in a saddle 42 suspended pivotally from the spindle 16, and at its ends by stirrups S rigidly secured to the axles. A leaf spring 44 lies on the upper side of the rocker arm 41 with its end portions 45 also held in the stirrups S, and its central portion, within the saddle 42, secured to the rocker arm by a bolt 46. The lower internal face of the saddle 42 is of anticlinal form, providing two surfaces 47 which are inclined upwardly toward each other. Two wedge blocks 48 are insertable into the saddle from opposite sides thereof, and they have a bolt 49 extending through them by which they may be drawn together to coact with the surfaces 47 to hold the rocker arm 41 and leaf spring 44 in tight engagement with a reinforcing plate 51 which also extends through the saddle and is secured to the spring and rocker arm by the bolt 46. The plate 51 is thus forced against the upper portion of the saddle, and the wedge blocks, rocker arm, spring, and plate completely and rigidly fill the saddle.

Disalined openings 52 are formed in the blocks 48 into either of which any suitable tool may be extended and struck to force the other block from the saddle and allow the removal of the rocker arm and leaf spring.

The saddle 42 has twin hubs 53 by which it is rotatably suspended from the spindle 16 with interposed bushings 54 and 55, with one of the hubs positioned between the cylindrical portions 21 and 22 of the bracket 18, and the other positioned outwardly from the outer of said cylindrical portions, so that the saddle is restrained from lateral movement on the spindle 16 by the bracket.

The stirrups S comprise each a pair of half-brackets 56 and 57 opposing each other in forward and aft relation, and drawable toward each other by bolts 58, bracket 57 being furthest from the saddle 42. They are so shaped that their opposed surfaces form a rectangular opening 59 for the rectangular ends 61 of the axles 36, and below the opening 59 and at right angles thereto they have alined and substantially rectangular passages 62 which conjoin in each stirrup to form openings 63 to receive the ends of the rocker arm 41 and the spring 44. The lower interior surfaces, or treads 64, of the stirrup openings 63 are inclined downwardly in outward directions from the saddle 42 so as to form receptacles for the rocker arms relatively narrow vertically at the point of entry of the arms and expanding vertically toward the outer ends of the openings.

The ends 65 of the rocker arm 41 are inclined downwardly at the same slope so as to lie in contact with the treads and to leave increasing free space above them toward their extremities. The medial portion of the rocker arm 41 between the downward slope ends 65 is of greater vertical thickness than said ends, to prevent the arm from being pushed outwardly through the stirrup. The upper interior surfaces of the openings 63 are broken away where they are alined with the opening 59, so that the openings 59 and 63 are in communication with each other, and the lower surface of the axle end 61 protrudes into the opening 63.

The outer brackets 57 are provided with downwardly extending shoulders 66 spaced from the axle end 61 so as to form recesses 67 therebetween. The spring ends 45 are bent upwardly from the rocker-arm ends 65 so as to permit downward flexing of the spring ends under pressure, and wedges 68 are inserted in the openings 63 so as to bear downwardly on the spring ends 45 and upwardly on the axle end 61 and are held in place by heel flanges 69 engaged by the recesses 67. At the inner ends of the openings 63, the spring ends 45 therefore coact with the wedges 68 to wedge the rocker arm ends snugly in place, and from there outwardly, in the expanded portion of the opening 63, are susceptible to flexing.

To limit upward movement of the axles 36 and to restrain them from lateral movement, each of the stirrups S is capped by a rubber bumper pad 69, and a wear plate 70 is secured to the frame thereabove with a flange 71 bent inwardly and downwardly to present downward facing and outward facing contact surfaces to the rubber bumper. As there are no load-carrying springs in this form of bogie, the relative height of the bumpers 69 and plates 71 is not affected by the load on the vehicle and remains constant except for changes caused by road-surface conditions affecting the rocker arm 41. The normal relative height thus made possible is such that the bumpers overlap the lower margins of the plates and are guided outwardly thereby.

Further connecting the axles 36 with the jackshaft 15, to hold them at fixed horizontal spacing, are radius rods 72 connected to the inner stirrup brackets 56 by horizontal pivots 73 and to the saddle 42 by ball and socket joints 74. The socket plates 75 are bolted to the hubs 53 of the saddle. The radius rods 72 normally lie in planes containing the axis of rotation of the saddle 42 and the axes of their respective axles. They thus, with respect to each axle, form a jointed side of a quadrilateral figure which has at its other three sides the saddle, one half of the rocker arm which is rigid with the saddle, and the stirrup.

Each of these quadrilaterals is sufficiently flexible to absorb vibration and yet is sufficiently rigid to resist distortion. As the two quadrilaterals have in common the inflexible unit of the saddle and rocker arm, they may pivot jointly on the spindle 16 but they cooperate to resist torque applied to either stirrup, and thereby prevent hopping of the wheels. The mechanics of their cooperation will now be explained.

Considering again the spring 44, it will be seen that this spring is throughout all its center portion merely a supplement to the rocker arm 41 with which it is in contact, and does not flexibly support any weight. As a spring, its center portion has only the function of yielding to any irregularities or manufacturing imperfections in the saddle 42 when the wedges 48 are forced into place, so as to permit a tight grip on the rocker arm. The contact of the rocker arm and spring extends into the narrow ends of the stirrup openings 63 which are completely filled by those elements and by the toes of the wedges 68, so as rigidly to support the weight of the vehicle upon the axles 36.

Because the inflexible ends 65 of the rocker arm are in contact throughout their length with the tread surfaces 64 of the stirrups, the stirrups cannot rotate so as to move their lower portions outwardly from the center of the bogie, except as the entire rocker arm may permit such movement by swinging on the spindle 16. That is to say, the left hand stirrup in Figs. 1 and 4 cannot rotate clockwise, and the right hand stirrup cannot rotate counterclockwise. Either stirrup may move slightly in the other possible direction by pressing the heel of the wedge 68 against the spring end 45, but such movement is resisted by the flexing of the spring.

It will, therefore, be seen that when torque is applied to the axles 36, as by the application of the brakes, the bogie unit as a whole will resist such torque. If the vehicle were moving to the left in Fig. 1, the torque would tend to rotate both axles in counterclockwise direction. While the left-hand, or forward axle might rotate slightly upon the horizontal pivot 73 as a center, in order to do so it would have to cause flexing of the spring end 65 and would have to move the rocker arm 41 rearwardly. The rearward movement of the rocker arm could be accomplished only by pivotally moving the saddle 42 on the spindle 16.

Such pivotal movement would change the horizontal position of the rocker arm by a very slight degree and permit only the slightest rotation of the rearward stirrup. And the rotation of the rearward stirrup would, in turn, place the rearward radius rod 72 under tension, tending to pull the saddle 42 back to its original position. Thus while the bogie unit is not absolutely rigid, each element successively affected by the torque is counteractive to it, and the next result is that very little movement takes place, and wheel hopping is effectively reduced.

When a road-surface irregularity is encountered, the rocker arm acts as a lever, and by the principle of leverage reduces movement of the weight, that is to say, the vehicle body. As the vehicle weight is at the jack-shaft, half way between the applied force, or affected wheel, and the fulcrum or unaffected wheel, the body is moved vertically only one half the height of the surface irregularity. Axle torque produced by such encounters will be resisted as heretofore described, but there will be no reverse throw, as ordinarily caused by springs, and the resistance generated around the parallelogram of elements has the effect of a spring in keeping the affected wheel on the ground.

As the longitudinal movement of the rocker arm is restrained as above indicated to a degree of movement even less than that which ordinarily is possible at the ends of a spring, the axles 36 are held more rigidly at their distances from the jackshaft 15, and the chains 39 are less affected by relaxation and tensioning.

We claim:

1. In a four wheel bogie unit: a vehicle frame; a pair of coaxial spindles extending transversely of said frame and secured thereto; rocker arms pivoted between their ends on said spindles; two axles extending transversely of said frame at opposite sides of said spindles; stirrups rigidly engaging said axles and having openings for receiving the ends of said rocker arms; radius rods pivotally connected to said spindle and to said stirrups above said rocker arms and positioned substantially on lines connecting the axes of said axles and said spindle, and defining with said stirrups and said rocker arm a distortable geometric figure; said openings expanding vertically from the point of entry therein of said rocker arm ends and having lower margins adapted to engage the under side of said rocker arm ends at points spaced apart along said rocker arms; and means coacting on said stirrups and said rocker arms for causing said rocker arm ends to fit snugly in said stirrups at their points of entry therein, whereby distortion of said geometric figure is resisted.

2. A four wheel bogie unit as embodied in claim 1, wherein said coacting means comprise wedge members adapted to leave free space between the upper surfaces of said rocker arm ends and the interior upper margins of said openings at the expanded ends of said openings.

3. A four wheel bogie unit as embodied in claim 1, wherein said coacting means comprise members adapted to leave free space between the upper surfaces of said rocker arm ends and the interior upper margins of said openings at the expanded ends of said openings, one of said members in each instance having a flexible portion extending into said expanded end.

4. In a bogie construction: a support; a saddle pivotally suspended from said support and having a sleeve like opening in its lower portion substantially at a right angle to the pivot axis of said support; a rocker arm; a spring leaf; said arm and said leaf being secured in said opening with said leaf above said arm, and having front and rear end portions of substantially equal length extending therefrom; a bogie axle corresponding to each arm end; a stirrup so mounted on each bogie axle as to prevent relative movement of said stirrup and said axle, and having an opening below said axle for receiving the adjacent ends of said arm and said leaf so that said stirrup extends along and engages the lower side of said arm; additional wedge members adapted to hold said arm and said leaf snugly in said opening at their point of entry thereto; that part of said leaf within said opening beyond said point of entry being normally flexed out of contact with said arm; whereby rotation of said axle and said stirrup is resisted in one direction by the engagement of said arm with said stirrup, and in the other direction by the flexed part of said leaf; and front and rear radius rods having flexible connections at their ends connecting the same to their corresponding stirrups and to the saddle.

5. A bogie construction according to claim 4 having means connected with said arm exteriorly of said openings resistant to movement of said arm inwardly of said openings.

6. A bogie construction according to claim 4 in which said radius rods are so positioned as to form with said saddle and said arm a pair of substantially quadrilateral figures having one side in common, and inflexible at one end of said common side and having limited flexibility at their other angles.

7. In a four wheel bogie unit; a vehicle frame; a pair of coaxial spindles extending transversely of said frame and secured thereto; saddles pivotally suspended from each of said spindles having sleeve-like openings in their lower ends; forward and rearward bogie axles on opposite sides of said spindles; stirrups rigidly engaging said axles on each side of said vehicle frame; rocker arms rigidly held in said saddles and having their end portions engaged by said stirrups, so as to transmit vertical movement of any one stirrup to its associated spindle about the other associated stirrup as a fulcrum; and forward and rearward radius rods connecting said stirrups to their associated spindles and having flexible connections with said rods and said spindles.

8. A four wheel bogie unit as embodied in claim 7 wherein said radius rods are in the planes of the axes of their associated stirrups and spindles, whereby simultaneous rotation of said spindles and said stirrups is resisted.

9. A four wheel bogie unit as embodied in claim 7 having spring means acting on said rocker arm ends and on said stirrups for resisting relative movement thereof.

10. In a four wheel bogie unit; a vehicle frame; forward and rearward bogie axles; stirrups on said axles; rocker arms engaged by said stirrups connecting said axles; spindles secured to said frame; means for pivotally mounting said rocker arms substantially at the mid-points thereof upon said spindles; and springs secured to said arms and extending into said stirrups to resist relative movement of said arms and said stirrups.

11. A four wheel bogie unit as embodied in claim 10, wherein the means for pivotally mounting the rocker arms comprise saddles pivotable on said spindles and rigidly engaging said rocker arms; and radius rods flexibly connected to said saddles and to said stirrups.

HARRISON J. WILLIAMS.
MICHAEL AMBARCUMIAN.

REFERENCES CITED

The following references are of record in the file of this patent:

UNITED STATES PATENTS

| Number | Name | Date |
|---|---|---|
| 1,126,326 | Whittelsey | Jan. 26, 1915 |
| 1,692,891 | Fageol | Nov. 27, 1928 |
| 1,947,358 | Rayburn | Feb. 13, 1934 |